United States Patent
Master et al.

(10) Patent No.: US 6,795,686 B2
(45) Date of Patent: Sep. 21, 2004

(54) METHOD AND SYSTEM FOR INCREASING AVAILABILITY AND PROXIMITY OF BASE STATIONS FOR CELLULAR COMMUNICATIONS VIA MOBILE BASE STATIONS

(75) Inventors: Paul Master, Sunnyvale, CA (US); John Watson, Edgewood, WA (US)

(73) Assignee: Quicksilver Technology, San Jose, CA (US)

( * ) Notice: Subject to any disclaimer, the term of this patent is extended or adjusted under 35 U.S.C. 154(b) by 0 days.

(21) Appl. No.: 10/010,596

(22) Filed: Dec. 5, 2001

(65) Prior Publication Data

US 2003/0236106 A1 Dec. 25, 2003

(51) Int. Cl.$^7$ ............................ H04B 7/15; H04Q 7/20
(52) U.S. Cl. ................ 455/11.1; 455/561; 455/405; 455/424; 455/426.2
(58) Field of Search .................. 455/561, 11.1, 455/507, 405, 414.1, 556.1, 424, 426.2

(56) References Cited

U.S. PATENT DOCUMENTS

| | | | | |
|---|---|---|---|---|
| 5,758,261 A | * | 5/1998 | Wiedeman | 455/13.1 |
| 6,026,277 A | | 2/2000 | Gavrilovich | 455/11.1 |
| 6,198,924 B1 | * | 3/2001 | Ishii et al. | 455/434 |
| 6,243,575 B1 | | 6/2001 | Ohyama et al. | 455/422 |
| 6,246,883 B1 | * | 6/2001 | Lee | 455/507 |
| 6,263,057 B1 | * | 7/2001 | Silverman | 379/114 |

* cited by examiner

*Primary Examiner*—Lee Nguyen
*Assistant Examiner*—Eugene Yun
(74) *Attorney, Agent, or Firm*—Sawyer Law Group LLP

(57) ABSTRACT

Aspects of a method and system for increasing availability and proximity of base stations for cellular communications are provided. The aspects include providing a mobile base station as a feature of a motor vehicle. Adaptive capabilities within the mobile base station are utilized for compatibility with a mobile phone. Cellular communications are performed with the mobile phone via the mobile base station.

24 Claims, 4 Drawing Sheets

106

METHOD AND SYSTEM FOR INCREASING AVAILABILITY AND PROXIMITY OF BASE STATIONS FOR CELLULAR COMMUNICATIONS VIA MOBILE BASE STATIONS

FIELD OF THE INVENTION

The present invention relates to base stations in a cellular communication system, and more particularly to a mobile base station for use in a cellular communication system.

BACKGROUND OF THE INVENTION

Most consumers rely on the convenience of a mobile phone to perform some portion of their everyday communication. These communications rely on radio signals to transfer information to and from the mobile phone via a base station. Base stations link mobile phones to the rest of the mobile and fixed phone network. The geographical area to which each base station provides radio coverage is referred to as a cell.

In a typical arrangement, a switching center controls a fixed base station in a cell site via a land wire with the base station serving a set of mobile phones. The switching center tracks calls and transfers them as the caller moves from one cell to the next within the network of cell sites and base stations. As the distance between a mobile phone and a base station increases, signal strength diminishes and adequate reception is compromised, since mobile phones require a certain minimum signal strength for reception. Reception can also be compromised when interference with a stronger signal confuses the mobile phone, and, for example, in tunnels where there is a drop in signal strength. Further, limitations on the number of calls a base station can carry result from the limitations imposed by the amount of radio spectrum made available to each mobile phone operator. Thus, without sufficient base stations in the needed locations, mobile phones are unable to work. Of clear importance in the cellular communication industry, therefore, are the number and location of base stations available to a mobile phone user. The present invention addresses the need for achieving greater availability and proximity of base stations with mobile phone users.

SUMMARY OF THE INVENTION

Aspects of a method and system for increasing availability and proximity of base stations for cellular communications are provided. The aspects include providing a mobile base station as a feature of a motor vehicle. Adaptive capabilities within the mobile base station are utilized for compatibility with a mobile phone. Cellular communications are performed with the mobile phone via the mobile base station.

Through the present invention, the existing infrastructure of motor vehicles in the current society is advantageously employed to provide a widely available and accessible network of mobile base stations. In this manner, the number and proximity of base stations for cellular communications are readily and efficiently improved. The present invention further advantageously employs the feature of an adaptive computing engine within the mobile base station for increasing compatibility with cellular networks and improving performance based on changing environmental conditions during cellular communications. These and other advantages will become readily apparent from the following detailed description and accompanying drawings.

DETAILED DESCRIPTION OF THE INVENTION

The present invention relates to increasing availability and proximity of base stations in a mobile phone network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
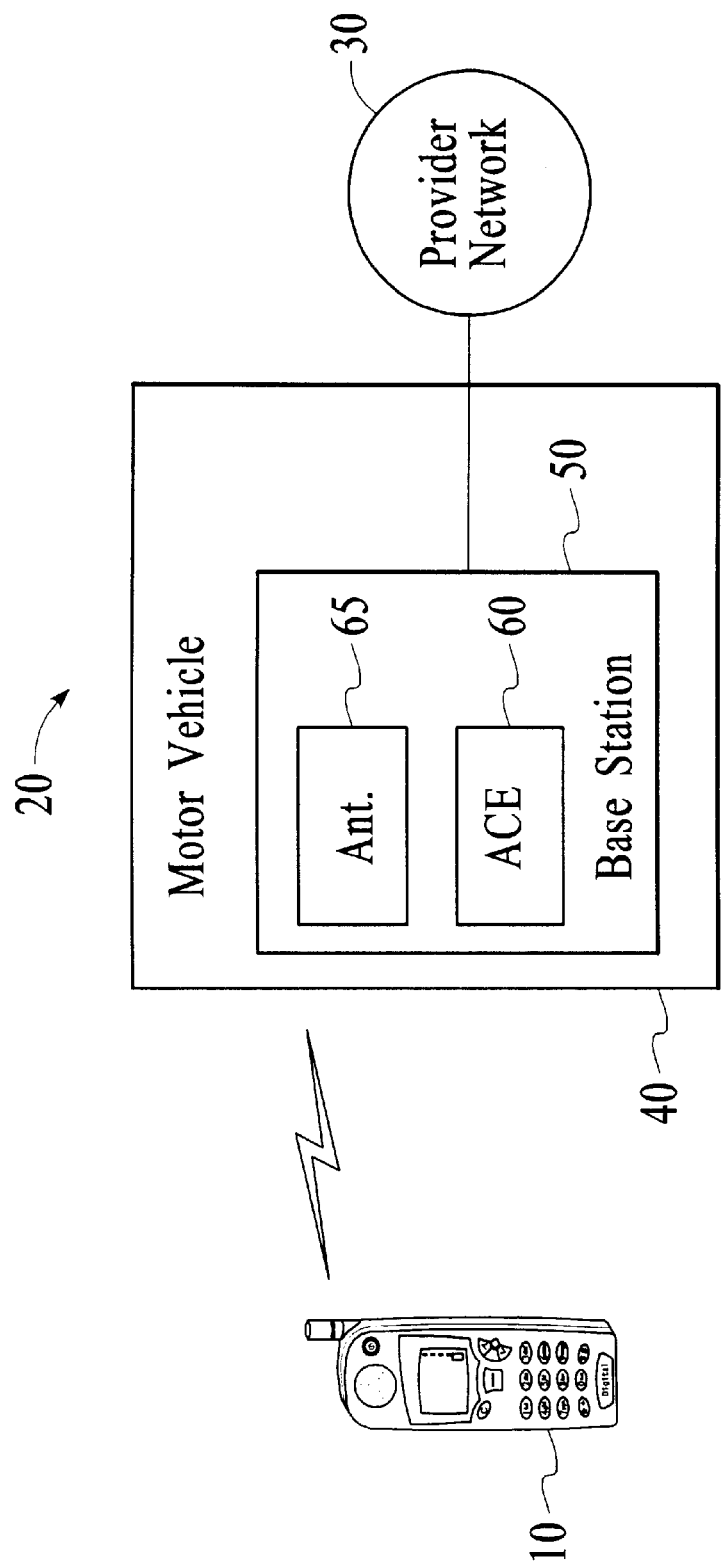
FIG. 1 illustrates a block diagram of an overall system environment with a mobile base station in accordance with the present invention.

In a preferred embodiment, an increase in the availability and proximity of base stations in a mobile phone network is achieved by providing a mobile base station. FIG. 1 illustrates a block diagram of an overall system environment in accordance with the present invention. As shown, the system environment includes a mobile phone unit 10, a mobile base station 20, and a cellular provider network 30. The mobile base station 20 is preferably provided within a motor vehicle 40, such as an automobile, to utilize the power generation capabilities of the motor vehicle 40, as is well understood by those skilled in the art. Of course, while motor vehicles represent a well established environment that corresponds similarly in density with user density, other environments offering comparable availability are also within the scope of the present invention. In a preferred embodiment, the processing operations of a base station 50 within the motor vehicle 40 are achieved utilizing an adaptive computing engine (ACE) 60, as described in further detail hereinbelow, in conjunction with an antenna 65 for signal transmission and reception, as is commonly understood. While FIG. 1 illustrates a single motor vehicle 40, it is expected that the capabilities of the mobile base station 20 could be readily implemented in a plurality of motor vehicles. In this manner, an entire network of mobile base stations 20 could be formed. With such a network, the possibility exists to "gang" multiple mobile base stations to perform collective tasks, e.g., synthesize adaptive antenna arrays, reduce multi-user interferences, share digital signal processing (DSP) across under-utilized mobile base stations/find a "better" mobile base station, etc.

Figure 2:
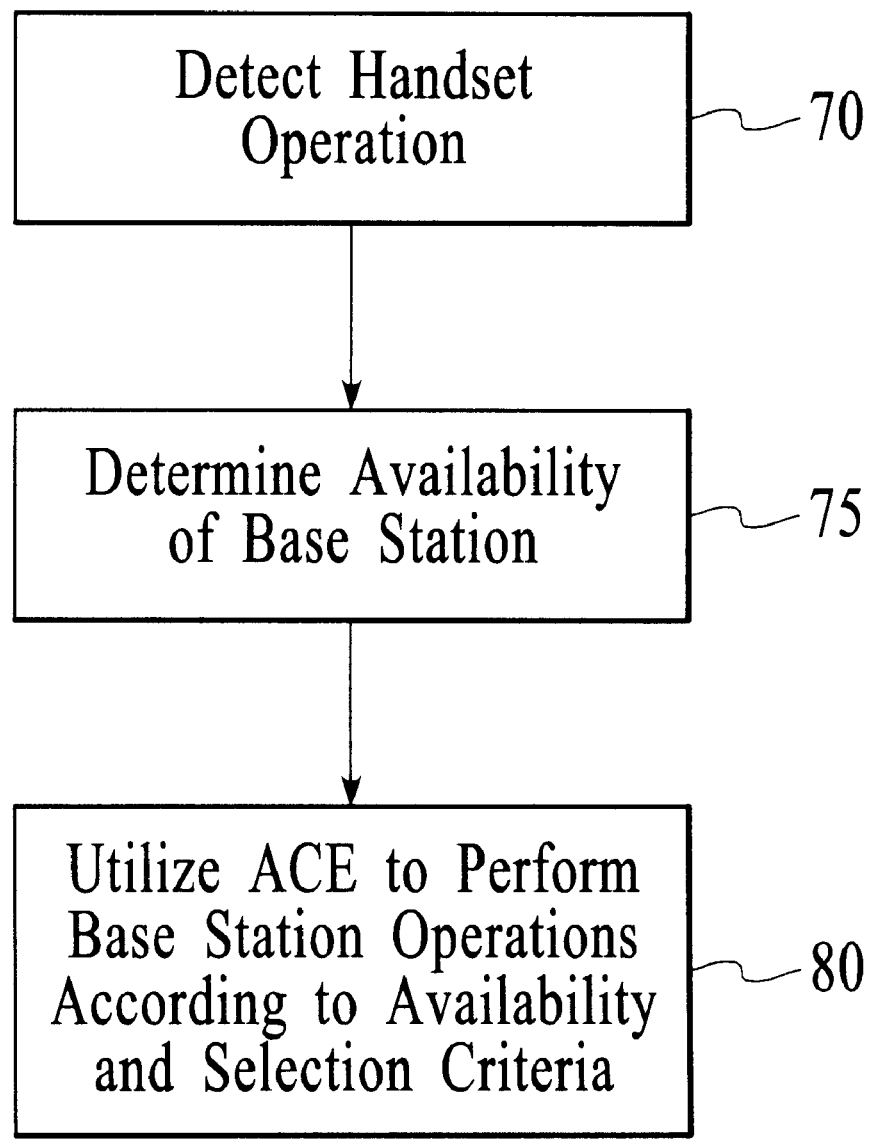
FIG. 2 illustrates a block flow diagram of operations within the system environment of FIG. 1.

Referring now to FIG. 2, in a preferred embodiment, the initiation of operation, e.g., power-up, in the mobile phone unit 10 is detected by the mobile base station 20 (step 70). The mobile base station 20 determines whether a terrestrial base station within the provider network 30 is available for use by the mobile phone unit 10 (step 75). In a preferred embodiment, base station refers to both terrestrial and space base stations. When there is not a terrestrial base station available, the mobile base station 20 performs the base station operations for the mobile phone unit 10 according to standard techniques through utilization of ACE 60 to achieve communication in the provider network 30 (step 80). In this manner, the mobile phone unit 10 is unable to detect that the base station operations are not occurring by a base station in the provider network. Thus, the mobile base station 20 can spoof the mobile phone unit 10 into communicating with it. The mobile base station 20 can also perform in a relay mode, such that it translates the protocol of the mobile phone unit 10 for any of the protocols of the provider network 30. Further, when performing base station operations, the mobile base station 20 may also utilize predetermined criteria to select among multiple provider networks. The predetermined criteria includes such factors as cost per minute, strength of signal, network availability, quality and percentage utilization.

A preferred embodiment of an adaptable computing engine for utilization within the mobile base station 20 to achieve the operations described with reference to FIG. 2 is described in co-pending U.S. patent application, Ser. No. 09/815,222, entitled "Adaptive Integrated Circuitry with Heterogeneous and Reconfigurable Matrices of Diverse and Adaptive Computational Units Having Fixed, Application Specific Computational Elements." assigned to the assignee of the present invention and incorporated by reference in its entirety herein. Portions of that description are reproduced hereinbelow for clarity of presentation of the aspects of the present invention.

Figure 3:
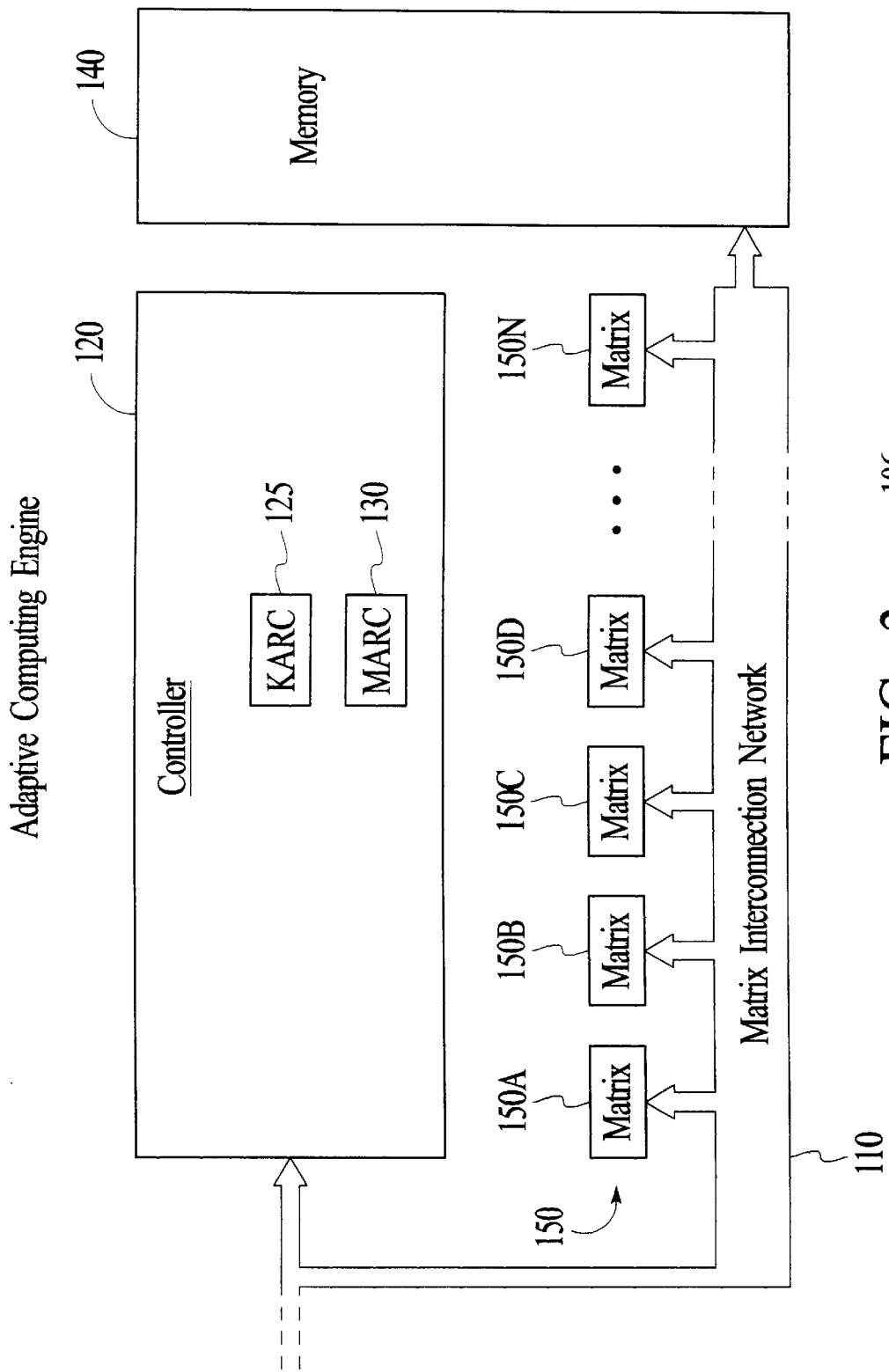
FIG. 3 is a block diagram illustrating an adaptive computing engine utilized within at least the mobile base station in accordance with the present invention.

Referring to FIG. 3, a block diagram illustrates an adaptive computing engine ("ACE") 100, which is preferably embodied as an integrated circuit, or as a portion of an integrated circuit having other, additional components. In the preferred embodiment, and as discussed in greater detail below, the ACE 100 includes a controller 120, one or more reconfigurable matrices 150, such as matrices 150A through 150N as illustrated, a matrix interconnection network 110, and preferably also includes a memory 140. It should be appreciated that, although the controller 120 is illustrated as a separate component, for the ACE 100, the controller 120 functionality is granted to one or more matrices, making a delineation between them seemingly negligible.

A significant departure from the prior art, the ACE 100 does not utilize traditional (and typically separate) data and instruction busses for signaling and other transmission between and among the reconfigurable matrices 150, the controller 120, and the memory 140, or for other input/output ("I/O") functionality. Rather, data, control and configuration information are transmitted between and among these elements, utilizing the matrix interconnection network 110, which may be configured and reconfigured, in real-time, to provide any given connection between and among the reconfigurable matrices 150, the controller 120 and the memory 140, as discussed in greater detail below.

The memory 140 may be implemented in any desired or preferred way as known in the art, and may be included within the ACE 100 or incorporated within another IC or portion of an IC. In the preferred embodiment, the memory 140 is included within the ACE 100, and preferably is a low power consumption random access memory (RAM), but also may be any other form of memory, such as flash, DRAM, SRAM, MRAM, ROM, FeRAM, EPROM or E$^2$PROM. In the preferred embodiment, the memory 140 preferably includes direct memory access (DMA) engines, not separately illustrated.

The controller 120 is preferably implemented as a reduced instruction set ("RISC") processor, controller or other device or IC capable of performing the two types of functionality discussed below. The first control functionality, referred to as "kernal" control, is illustrated as kernal controller ("KARC") 125, and the second control functionality, referred to as "matrix" control, is illustrated as matrix controller ("MARC") 130.

The various matrices 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of computation units (200, FIG. 4), which in turn generally contain a different or varied mix of fixed, application specific computational elements (250, FIG. 4), which may be connected, configured and reconfigured in various ways to perform varied functions, through the interconnection networks. In addition to varied internal configurations and reconfigurations, the various matrices 150 may be connected, configured and reconfigured at a higher level, with respect to each of the other matrices 150, through the matrix interconnection network 110.

Figure 4:
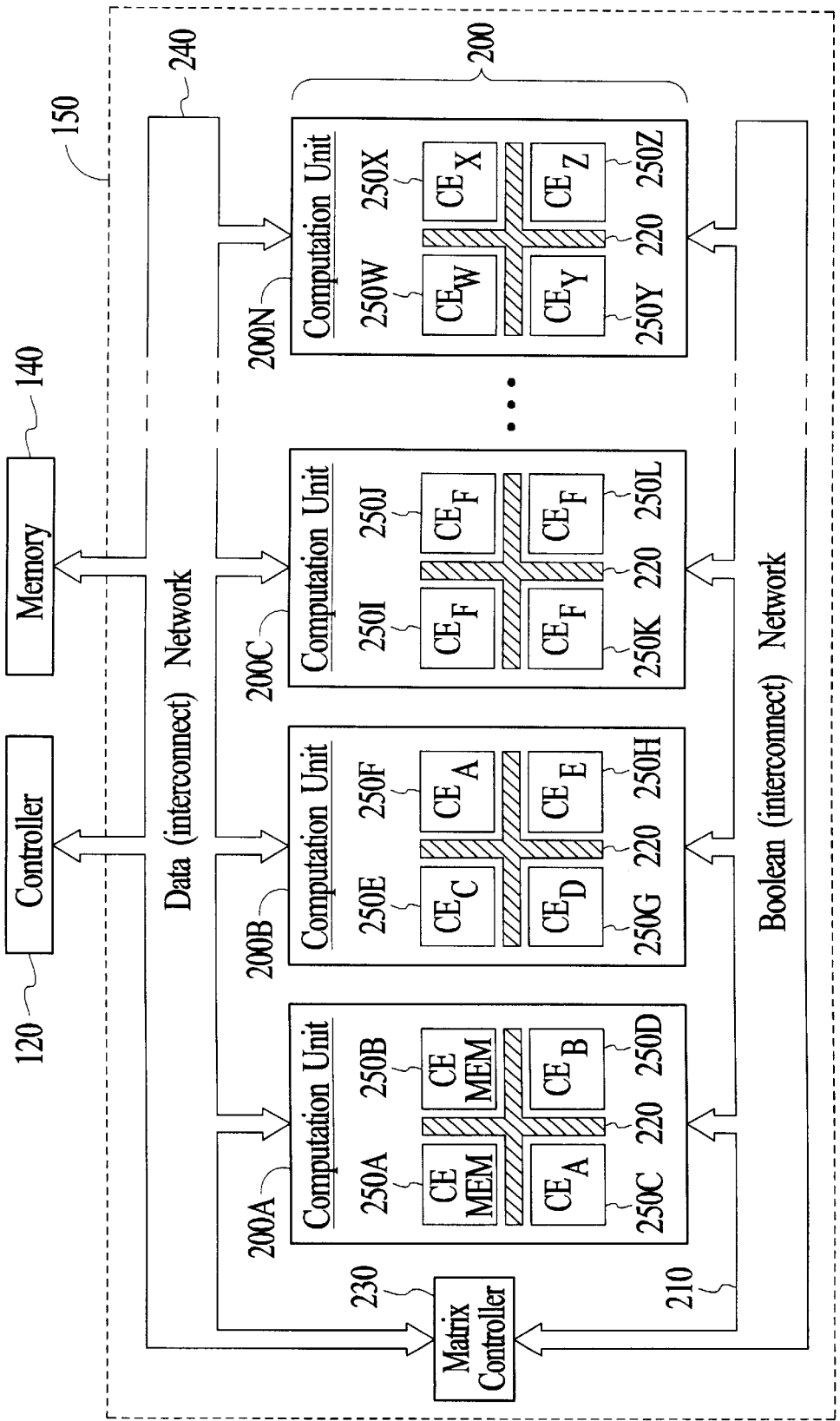
FIG. 4 is a block diagram illustrating, in greater detail, a reconfigurable matrix with a plurality of computation units and a plurality of computational elements of the adaptive computing engine.

Referring now to FIG. 4, a block diagram illustrates, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 4, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The Boolean interconnect network 210, as mentioned above, provides the reconfigurable interconnection capability between and among the various computation units 200, while the data interconnect network 240 provides the reconfigurable interconnection capability for data input and output between and among the various computation units 200. It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 4, included within a computation unit 200 are a plurality of computational elements 250, illustrated as computational elements 250A through 250Z (collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. The fixed computational elements 250 may be reconfigurably connected together to execute an algorithm or other function, at any given time, utilizing the interconnect 220, the Boolean network 210, and the matrix interconnection network 110.

In the preferred embodiment, the various computational elements 250 are designed and grouped together, into the various reconfigurable computation units 200. In addition to computational elements 250 which are designed to execute a particular algorithm or function, such as multiplication, other types of computational elements 250 may also be utilized. As illustrated in FIG. 4, computational elements 250A and 250B implement memory, to provide local memory elements for any given calculation or processing function (compared to the more "remote" memory 140). In addition, computational elements 250I, 250J, 250K and 250L are configured (using, for example, a plurality of flip-flops) to implement finite state machines, to provide local processing capability (compared to the more "remote" MARC 130), especially suitable for complicated control processing.

In the preferred embodiment, a matrix controller 230 is also included within any given matrix 150, to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

With the various types of different computational elements 250, which may be available, depending upon the desired functionality of the ACE 100, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 4, particularly useful for complicated control sequences, dynamic scheduling, and input/output management, while a fourth type may implement memory and memory management, such as computation unit 200A. Lastly, a fifth type of computation unit 200 may be included to perform bit-level manipulation, such as channel coding.

The adaptive nature of the ACE 60 (FIG. 1) being utilized within the mobile base station 20 allows for utilization within the mobile phone unit 10 to provide its necessary processing operations. This creates an even more highly adaptive system for tuning performance between the mobile base station 20 and the mobile phone unit 10. Further, in this manner, attempts to ensure high quality communication by monitoring performance characteristics of the communication and performing an appropriate adjustment for the communication when necessary based on the monitoring can be performed.

By way of example, environmental conditions during cellular communications change somewhat continuously as a user of the mobile phone unit 10 moves. Performance characteristics, such as co-channel interference and carrier-to-interference ratio (C/I) metrics, provide indications of changing environmental conditions. For example, if a mobile base station 20 detects close proximity to a tower of the provider network 30, a more complicated modulation type may be preferred to achieve more bits per Hertz of spectrum, as is well appreciated by those skilled in the art. The ACE 60 of the mobile base station 20 may be programmed to alter the modulation type being utilized under such circumstances, communicate a change in modulation type to the mobile phone unit 10 to adjust its ACE and modulation type, and process data according to the new modulation type once transmissions from the mobile phone unit 10 occur with the new modulation type. In another situation, rather than adjust the modulation type, the mobile base station 20 may detect undesirable co-channel interference and be programmed to alter the signal processing to achieve better performance. In this manner, the wireless communication can be optimized for any current environment of use. Included in these environments are areas that lack adequate terrestrial base station coverage. Thus, in a further embodiment, the mobile base station 20 can be adapted to transmit communications with the provider network 30 using the Low Earth Orbiting Satellite (LEOS) network.

With the present invention, the ability to provide a mobile base station as an integral feature of a motor vehicle creates significant opportunity to achieve a wider network of base stations for cellular communications. Further, the mobile base station provides great availability and proximity to consumers who are rarely too far from an automobile in today's society and tend to utilize their cellular phones often from within the automobile itself. In addition, the adaptive nature of the processing engine within the mobile base station in accordance with the present invention allows greater flexibility for usage with substantially any provider network utilizing substantially any type of modulation (e.g., TDMA, CDMA, GSM, etc.) and signal processing desired.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method for increasing availability and proximity of base stations for cellular communications, the method comprising:

providing a mobile base station as a feature of a motor vehicle;

utilizing adaptive capabilities of an adaptive computing engine operating by transmitting data, control, and configuration information between and among reconfigurable matrices, a controller, and memory utilizing a matrix interconnection network that may be configured and reconfigured in real-time to provide any given connection between and among the reconfigurable matrices, controller, and memory within the mobile base station for compatibility with a mobile phone; and performing cellular communications with the mobile phone via the mobile base station.

2. The method of claim 1 wherein performing cellular communications further comprises detecting initiation of operation in the mobile phone by the mobile base station, determining in the mobile base station whether a terrestrial base station is available, and performing terrestrial base station operations in the mobile base station when the terrestrial base station is not available.

3. The method of claim 2 wherein performing base stations operations further comprises utilizing predetermined criteria to select among multiple provider networks, the predetermined criteria including cost per minute, strength of signal, network availability, quality and percentage utilization.

4. The method of claim 2 wherein performing terrestrial base station operations further comprises performing translations between protocols.

5. The method of claim 1 wherein utilizing adaptive capabilities further comprises monitoring performance characteristics during communications to determine whether an adaptation of operation is necessary.

6. The method of claim 5 wherein monitoring performance characteristics further comprises measuring carrier to interference ratio.

7. The method of claim 5 wherein monitoring performance characteristics further comprises measuring co-channel interference.

8. The method of claim 5 wherein an adaptation of operation further comprises adapting a modulation type used for the cellular communication.

9. The method of claim 8 wherein an adaptation of operation further comprises adapting signal processing of transmitted data without altering the modulation type.

10. The method of claim 1 further comprising utilizing a LEOS network to transmit communications for the mobile phone via the mobile base station.

11. A system with increased availability and proximity of base stations for cellular communications comprising:
   a cellular provider network;
   a mobile phone unit for communicating data with the cellular provider network; and
   a mobile base station, the mobile base station provided as a feature of a motor vehicle and with an adaptive computing engine having adaptive capabilities by operating to transmit data, control, and configuration information between and among reconfigurable matrices, a controller, and memory utilizing a matrix interconnection network that may be configured and reconfigured in real-time to provide any given connection between and among the reconfigurable matrices, controller, and memory for compatibility with the mobile phone unit and performance of cellular communications within the cellular provider network.

12. The system of claim 11 wherein the mobile base station performs cellular communications by detecting initiation of operation in the mobile phone by the mobile base station, determining in the mobile base station whether a terrestrial base station is available, and performing terrestrial base station operations in the mobile base station when the terrestrial base station is not available.

13. The system of claim 12 wherein performing base station operations further comprises utilizing predetermined criteria to select among multiple provider networks, the predetermined criteria including cost per minute, strength of signal, network availability, quality and percentage utilization.

14. The system of claim 12 wherein performing base station operations further comprises performing translations between protocols.

15. The system of claim 11 wherein the mobile base station monitors performance characteristics during communications to determine whether an adaptation of operation is necessary.

16. The system of claim 15 wherein the mobile base station monitors performance characteristics by measuring carrier to interference ratio.

17. The system of claim 15 wherein an adaptation of operation further comprises adapting a modulation type used for the cellular communication.

18. The system of claim 17 wherein an adaptation of operation further comprises adapting signal processing of transmitted data without altering the modulation type.

19. The system of claim 11 wherein the mobile base station further communicates via a LEOS (Low Earth Orbiting Satellite) network for transmissions of the mobile phone unit.

20. A method for increasing availability and proximity of base stations for cellular communications, the method comprising:
   providing an adaptive computing engine capable of supporting cellular communication, the adaptive computing engine having adaptive capabilities by operating to transmit data, control, and configuration information between and among reconfigurable matrices, a controller, and memory utilizing a matrix interconnection network that may be configured and reconfigured in real-time to provide any given connection between and among the reconfigurable matrices, controller, and memory; and
   employing the adaptive computing engine within a base station to allow incorporation into a motor vehicle and formation of a mobile base station.

21. The method of claim 20 further comprising utilizing the mobile base station to support cellular communication from a mobile phone.

22. The method of claim 21 further comprising initiating the cellular communication from the mobile phone from within the motor vehicle.

23. The method of claim 21 further comprising tuning the mobile base station and the mobile phone to a same modulation type by altering the adaptive computing engine in at least the mobile base station.

24. The method of claim 23 further comprising employing an additional adaptive computing engine within the mobile phone.

* * * * *